United States Patent
Mizumaki

(10) Patent No.: US 8,035,327 B2
(45) Date of Patent: Oct. 11, 2011

(54) MOTOR DRIVE UNIT AND OPTICAL APPARATUS

(75) Inventor: Masao Mizumaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 391 days.

(21) Appl. No.: 12/360,448

(22) Filed: Jan. 27, 2009

(65) Prior Publication Data

US 2009/0189552 A1 Jul. 30, 2009

(30) Foreign Application Priority Data

Jan. 28, 2008 (JP) .................. 2008-015832

(51) Int. Cl.
*G05B 5/00* (2006.01)

(52) U.S. Cl. .................. 318/466; 318/280; 318/282

(58) Field of Classification Search .................. 318/466, 318/468, 280, 282, 799
See application file for complete search history.

(56) References Cited

U.S. PATENT DOCUMENTS

| | | | |
|---|---|---|---|
| 6,483,270 B1 * | 11/2002 | Miyazaki et al. ............. | 318/700 |
| 6,747,433 B2 * | 6/2004 | Kuwano et al. ............... | 318/685 |
| 6,826,499 B2 * | 11/2004 | Colosky et al. ................. | 702/85 |
| 7,149,419 B2 * | 12/2006 | Akada ............................. | 396/55 |
| 7,323,834 B2 * | 1/2008 | Kimura et al. ........... | 318/400.41 |

FOREIGN PATENT DOCUMENTS

| JP | 2566031 | 12/1996 |
|---|---|---|
| JP | 10-282395 | 10/1998 |

* cited by examiner

*Primary Examiner* — Rina Duda

(74) *Attorney, Agent, or Firm* — Cowan, Liebowitz & Latman, P.C.

(57) ABSTRACT

A motor drive unit includes a controller configured to drive a motor to a target position by using a first driving mode in which a state of energization of coils of the motor is switched in accordance with outputs from rotor position detectors and a second driving mode in which a state of energization of the coils is switched on the basis of a predetermined time interval. The controller turns on the energization of the coils during a predetermined time under an energization condition at a completion of driving to the target position when the rotor position detectors detect that the rotor position shifts from the target position after turning off the energization of the coils according to the completion of driving to the target position.

7 Claims, 12 Drawing Sheets

| Fno. | APERTURE MOTOR DRIVING STEP | CORRESPONDING VALUES OF BINARIZED SIGNALS OF HALL SENSOR OUTPUTS (A/B) |
|---|---|---|
| 5.657 | 6 | H/H |
| 6.169 | 7 | H/L |
| 6.727 | 8 | L/L |
| 7.336 | 9 | L/H |
| 8 | 10 | H/H |
| ⋮ | ⋮ | ⋮ |
| 32 | 26 | H/H |

| FINAL ENERGIZATION STATE OF AF MOTOR | CORRESPONDING VALUES OF BINARIZED SIGNALS OF HALL ELEMENT OUTPUTS |
|---|---|
| A−/B+ | H/H |
| A+/B+ | H/L |
| A+/B− | L/L |
| A−/B− | L/H |

MOTOR DRIVE UNIT AND OPTICAL APPARATUS

BACKGROUND OF THE INVENTION

The present invention relates to a motor drive unit such as a light-amount adjusting apparatus or a focusing apparatus used for an image-pickup optical device such as a video camera or a digital camera, and to an optical apparatus having the motor drive unit.

A camera such as a video camera or a digital camera having a solid-state image pickup device built-in, or a camera using film has a stop apparatus (a light-amount adjusting apparatus) which controls an aperture diameter in order to confirm a focal depth of a lens, and to adjust a light amount of an object imaged on a film or a solid-state image pickup device.

Such a camera has, not only a stop apparatus, but also a focusing apparatus which automatically adjusts a focal point of a shooting lens.

Some optical apparatuses for projecting images also have a light-amount adjusting apparatus or a focusing apparatus therein.

These light-amount adjusting apparatuses are mainly configured so as to vary their aperture diameters by driving a plurality of stop blades serving as light-shielding members with stepper motors serving as sources of driving force.

Further, those focusing apparatuses are mainly configured so as to adjust a focal point by driving some of shooting lens in its optical axis direction with stepper motors serving as sources of driving force.

In recent years, it has been desired to shorten a shutter time-lag in still image shooting by a camera, which has brought about an important issue that shortens a time required for stop driving or lens driving by driving a stepper motor to a target position at a high speed.

However, because a stepper motor may have a step-out due to high-speed driving or load fluctuation, it is necessary to set limits to a driving speed or calculate on a safety factor in torque. Therefore, the original performance cannot be used to the full.

In order to perform high-speed driving by using a stepper motor, a method of using a motor having wide steps or a method for reducing a reduction ratio of a transmission mechanism is conceivable. However, in this case, it is difficult to obtain a high resolution, which deteriorates accuracy in an aperture diameter or accuracy in focusing.

In a light-amount adjusting apparatus or a focusing apparatus with a stepper motor serving as a source of driving force, in a case of a digital camera for example, the apparatus starts energization of the stepper motor from a predetermined phase to determine an aperture diameter or a lens stop position in accordance with how many steps the rotor will be made to rotate.

Therefore, in order to obtain a high-accuracy aperture diameter or lens stop position, an angle of rotating the rotor is preferably smaller.

Further, in order to speed up a stepper motor without growing the stepper motor in size, a method for increasing a voltage or an electric current energizing in the motor may be used. In this case rapidly exhausts a battery serving as a power source.

Then, in order to avoid the battery serving as a power source from being consumed, after driving a motor to a predetermined position, it is preferable to turn off the energization of the motor at a high ratio. To that end, it is preferable to have many stop positions at which a rotor is capable of stably stopping per rotation of the rotor by cogging torque.

A light-amount adjusting apparatus or a focusing apparatus with a stepper motor serving as a source of driving force generally uses 1-2 phase excitation driving.

However, a number of positions at which the rotor is capable of stably stopping by cogging torque when turning off energization is the half of a number of positions at which the rotor is capable of stopping when continuing energization.

Turning off energization at a stop position at which the rotor becomes unsteady when turning off energization makes it impossible to specify whether the rotor shifts in a forward direction or shifts in the backward direction. As a result, an error of ± one step is brought about, which does not provide high accuracy in stopping when turning off energization.

Therefore, also when exposing for a relatively long time, it is necessary to continue energization of a coil in order to obtain high accuracy in stopping, which rapidly exhausts a battery serving as a power source.

As a solution to this problem, Japanese Patent No. 02566031 discloses a stepper motor which is configured so as to provide grooves at positions shifted by a predetermined angle from the center of the magnet pole on the outer circumferential surface of the magnet, to be capable of specifying a direction of rotating by cogging torque when turning off energization, which enables an improvement in stop accuracy without exhausting the battery during a long time exposure.

Moreover, Japanese Patent Laid-Open No. 10-282395 discloses a pulse motor by 1-2 phase excitation driving which is capable of obtaining required accuracy while lowering power consumption.

This motor using 1-2 phase excitation driving is configured such that, in a case of high-accuracy driving, the energization is turned off when stopping at a 1 phase excitation position, and the energization is maintained when stopping at a 2 phase excitation position. In a case of usual driving, the motor stops only at a 1 phase excitation position and the energization is turned off.

However, in the electromagnetic-driven light exposure amount adjusting apparatus disclosed in Japanese Patent No. 02566031, it is necessary to provide grooves in the outer circumferential surface of the magnet, and a sintered magnet or a compression magnet with strong magnetic force cannot be formed into such an accurate complicated shape.

Therefore, Japanese Patent No. 02566031 has a limitation that it is necessary to use an injection magnet with weak magnetic force.

Therefore, the motor has low torque or is required to increase a magnet diameter or a number of coil turns, which leads to a necessity to grow the motor in size.

Further, the outer circumferential surface of the magnet has grooves, which increases cogging torque. Thus, it is necessary to further grow the coil in size in order to operate the motor at a lower voltage and loud driving noise is brought about.

The pulse motor drive unit for a camera disclosed in Japanese Patent Laid-Open No. 10-282395, the energization is always to be maintained at a 2 phase excitation position in a case of high-accuracy driving. In a case of usual driving, the motor only stops at a 1 phase excitation position.

SUMMARY OF THE INVENTION

The present invention provides a motor drive unit which is capable of high-speed driving, and is capable of making an attempt to achieve both energy-saving and high accuracy by improving the accuracy in stop position when turning off the energization after driving to a predetermined position.

The present invention provides, as an aspect thereof, a motor drive unit comprising a motor having a coil and a rotor, a rotor position detector configured to which output signals on the basis of a rotor position, and a controller configured to drive the motor to a target position by using a first driving mode in which a state of energization of the coils of the motor is switched in accordance with outputs from the rotor position detectors and a second driving mode in which a state of energization of the coils is switched on the basis of a predetermined time interval. The controller turns on the energization of the coils during a predetermined time under an energization condition at a completion of driving to the target position when the rotor position detectors detect that a rotor position shifts from the target position after turning off the energization of the coils according to the completion of driving to the target position.

Other aspects of the present invention will be apparent from the embodiments described below with reference to the drawings.

DESCRIPTION OF THE EMBODIMENTS

Exemplary embodiments of the present invention will be described below with reference to the accompanied drawings.

Embodiment 1

FIGS. 1 to 9 are drawings according to Embodiment 1 of the present invention.

Figure 1:
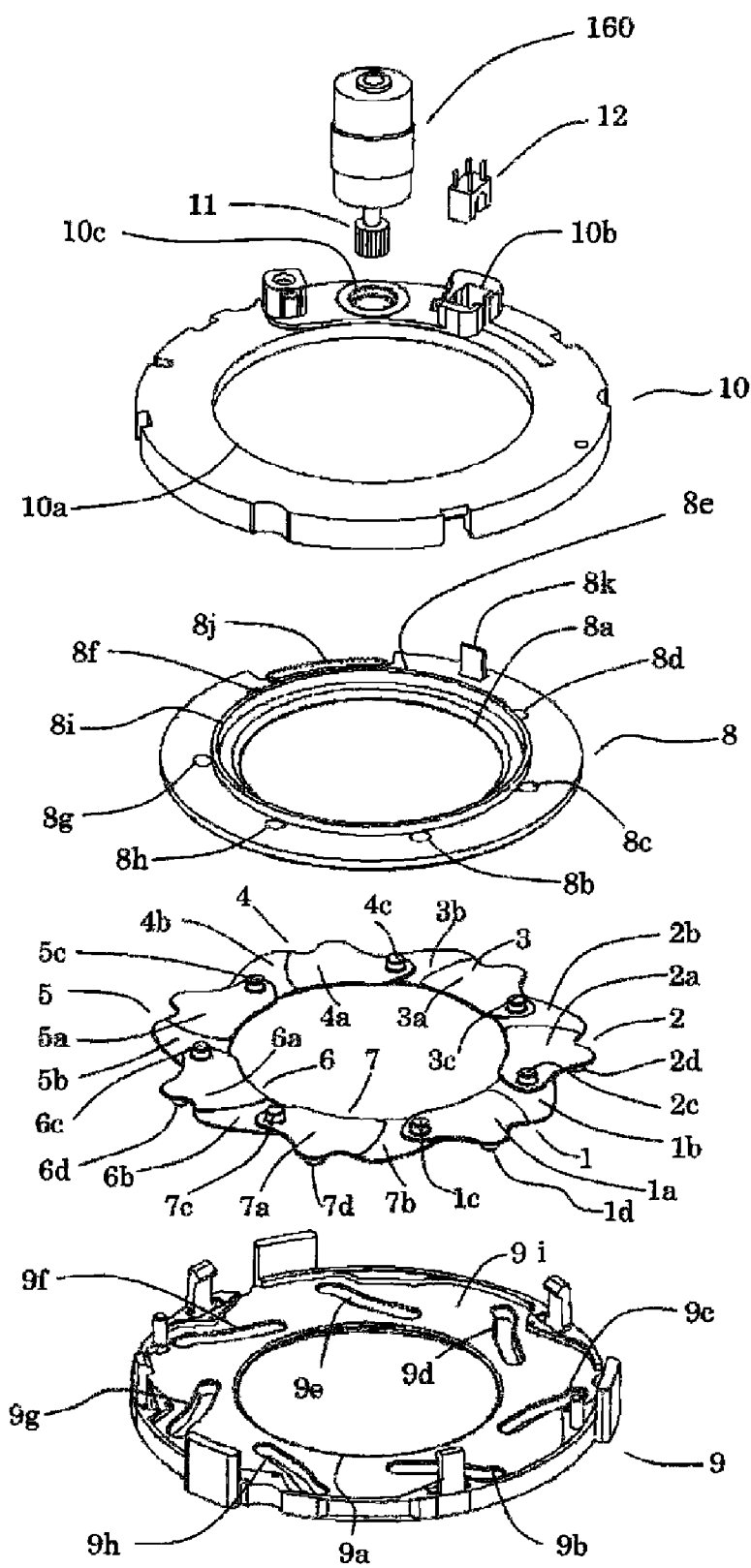
FIG. 1 is an exploded perspective view of a light-amount adjusting apparatus according to a first embodiment (Embodiment 1) of the present invention.

In FIG. 1, light-shielding blades 1 to 7 serve as light-amount adjusting members.

Laminar blade bases constituted by first bases 1a to 7a and second bases 1b to 7b with light-shielding effect to regulate an aperture amount columnar or cylindrical first shanks 1c to 7c provided to one planes of the first bases and columnar or cylindrical second shanks 1d to 7d provided to the other planes of the first bases integrally form the plurality of light-shielding blades. All of those are integrally formed of synthetic resin.

A driven member 8 (a rotary member) serves as a means for opening and closing the light-shielding blades 1 to 7. The rotary member 8 is formed into a ring form having an opening portion 8a in its center, and has holes 8b to 8h, a rotating fitting protrusion 8i, and a gear part 8j. Further, the rotary member 8 includes a light-shielding part 8k.

A ring-shaped cam member 9 has an opening portion 9a in its center, and includes cam groove portions 9b to 9h therein.

A ring-shaped supporting member 10 has an opening portion 10a in its center and a hole 10b and a motor attaching part 10c.

A motor 160 drives the rotary member 8. The motor 160 has a pinion gear 11 fixed to the tip of a shaft thereof, which is attached to the motor attaching part 10c of the supporting member 10.

At that time, the pinion gear 11 passes through the hole 10c of the supporting member 10 to engage with the gear part 8j of the rotary member 8. The motor 160 is a 2 phase stepper motor having two coils, which is arranged two rotor position detecting sensors.

Figure 2:
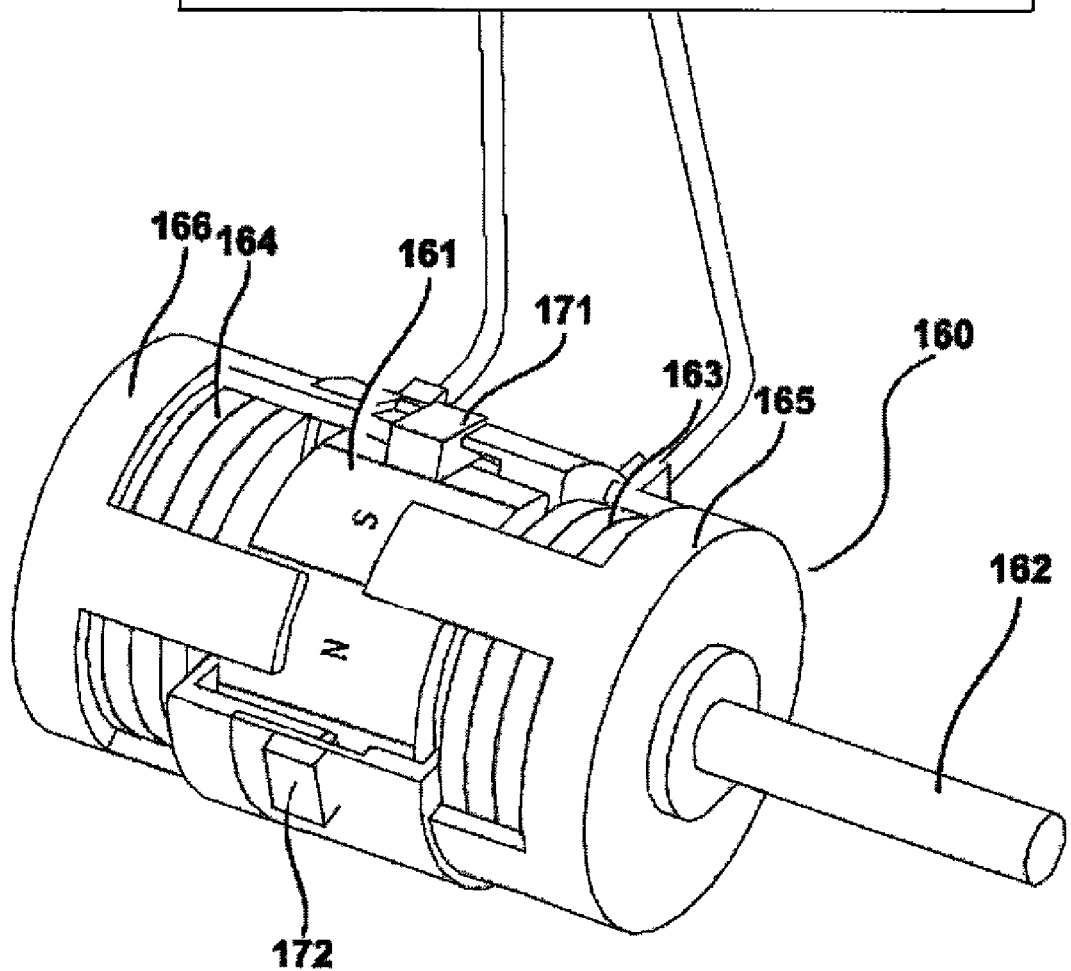
FIG. 2 is an axial sectional view showing a phase relationship between yokes, rotors, and rotor position detecting sensors in a motor.

A configuration of the motor 160 will be described in detail with reference to FIG. 2. The configuration of the motor 160 is the same as that disclosed in Japanese Patent Laid-Open No. 09-331666 by the present applicant.

The motor 160 is constituted by a rotor 162 having a magnet 161, a first coil 163, a second coil 164, a first yoke 165, a second yoke 166, and a first rotor position detecting sensor 171 and a second rotor position detecting sensor 172 serving as rotor position detectors.

Among those, the first coil 163, the second coil 164, the first yoke 165, the second yoke 166, the first rotor position detecting sensor 171, and the second rotor position detecting sensor 172 constitute a stator. The motor 160 is connected to energization switching drivers 28 and 29 in FIG. 4.

The magnet 161 is a cylindrical permanent magnet whose outer circumference is made magnetized multipolar. The magnet 161 has a magnetized pattern where the magnitude of radial magnetic force varies in a sinusoidal waveform in accordance with an angular position.

The rotor 162 is rotatably supported on the stator to be fixed integrally with the magnet 161.

The first yoke 165 has four magnetic pole pieces 165a to 165d excited by the first coil 163. The magnetic pole pieces 165a to 165d face one another with predetermined intervals along the outer circumferential surface of the magnet 161.

The second yoke 166 has four magnetic pole pieces 166a to 166d excited by the second coil 164. The magnetic pole pieces 166a to 166d face the outer circumferential surface of the magnet 161 with predetermined intervals.

The first rotor position detecting sensor 171 and the second rotor position detecting sensor 172 are hall sensors that detect magnetic fluxes of the magnet 161. An initial position sensor 12 detects whether or not the light-shielding part 8k provided to the rotary member 8 is inserted therein, and thereby recognize whether or not the rotary member 8 is at the initial position.

The supporting member 10 is fixed to the cam member 9 so as to sandwich the rotary member 8 and the light-shielding blades 1 to 7, to support the rotary member 8 and the light-shielding blades 1 to 7. The rotating fitting protrusion 8i of the rotary member 8 fits into the opening portion 10a of the supporting member 10 so as to be rotatably supported.

The first shanks 1c to 7c of the light-shielding blades 1 to 7 respectively fit rotatably into the holes 8b to 8h of the rotary member 8, and the second shanks 1d to 7d respectively fit slidably into the cam grooves 9b to 9h of the cam member 9.

The light-shielding blades 1 to 7 are equiangularly arranged centering on the optical axis. The light-shielding blades 1 to 7 control a stop aperture by overlapping the first bases 1a to 7a and the second bases 1b to 7b respectively having light-shielding effect. The greater the overlapping is, the smaller stop aperture amount becomes.

As described above, the light-shielding blades 1 to 7, the rotary member 8, the cam member 9, the supporting member 10, the motor 160, the pinion gear 11, and the initial position sensor 12 constitute the light-amount adjusting apparatus driven by the motor.

Figure 4:
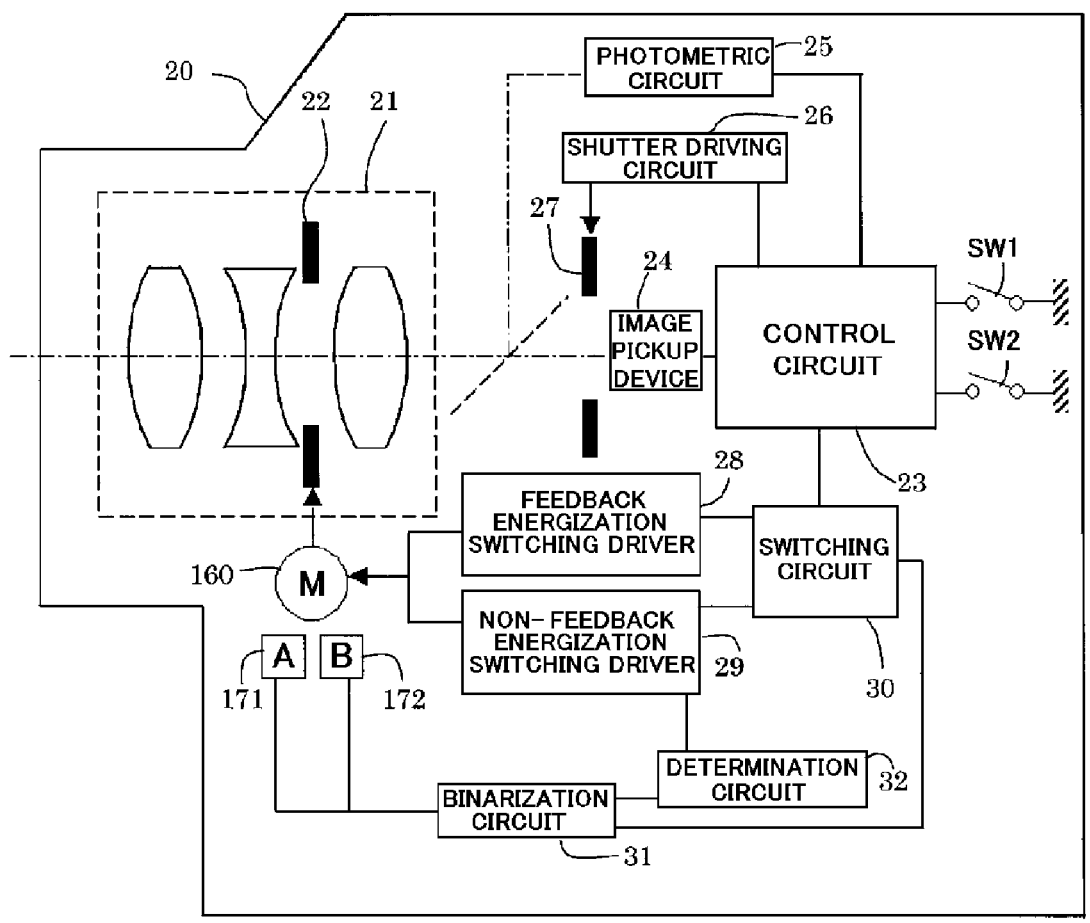
FIG. 4 is a block diagram showing a configuration of an optical apparatus having the light-amount adjusting apparatus in FIG. 1.

FIG. 4 is a block diagram showing a configuration of an optical apparatus 20 having the light-amount adjusting apparatus.

A light from an object passes through the shooting lens 21 to enter an image pickup device 24 (an image pickup recorder). A stop apparatus 22 is built in the shooting lens 21, and the motor 160 drives the stop apparatus 22.

The stop apparatus 22 is constituted by the light-shielding blades 1 to 7, the rotary member 8, the cam member 9, and the supporting member 10. A control circuit 23 includes a microcomputer that controls the entire optical apparatus 20.

The image pickup device 24 is constituted by a photoelectric conversion element such as a CCD or a CMOS. An output signal obtained by photoelectric conversion in the image pickup device 24 is amplified in the control circuit 23 to be output as a digital image signal.

The optical apparatus 20 in the present embodiment forms a moving image/still image by using this image signal. A photometric circuit 25 detects a light from the object to output the detected signal to the control circuit 23, and the control circuit 23 calculates an optimum shutter speed and an aperture value.

A shutter driving circuit 26 drives a shutter apparatus 27 on the basis of the shutter speed calculated above.

A feedback energization switching driver 28 serves as a first driving means, a non-feedback energization switching driver 29 serves as a second driving means, and a switching circuit 30 serves as a driving switch means. The feedback energization switching driver 28, the non-feedback energization switching driver 29, and the switching circuit 30 constitute a driving circuit for the motor 160.

The feedback energization switching driver 28 drives the motor 160 on the basis of a calculated aperture value. At that time, the feedback energization switching driver 28 switches the energization of the coils on the basis of detection signals output from the first rotor position detecting sensor 171 and the second rotor position detecting sensor 172.

The non-feedback energization switching driver 29 drives the motor 160 on the basis of a calculated aperture value. At that time, the non-feedback energization switching driver 29 switches the energization of the coils on the basis of an input driving pulse interval (driving frequency). This driving method is the same as a driving method for a usual 2 phase step motor.

The switching circuit 30 is a circuit to switch the feedback energization switching driver 28 and the non-feedback energization switching driver 29 at the time of driving the motor 160. The two driving drivers 28, 29 and the switching circuit 30 will be described later.

The motor 160 rotates on the basis of an output from the above-described motor driving circuit to drive the stop apparatus 22. The first rotor position detecting sensor 171 is constituted by a hall sensor, and the second rotor position detecting sensor 172 is constituted by a hall sensor, and they detect a rotor position of the motor 160 to output its detection signal.

A binarization circuit 31 binarizes output signals from the first rotor position detecting sensor 171 and the second rotor position detecting sensor 172 and output those.

A determination circuit 32 determines whether or not a rotor position of the motor 160 is at a normal position with respect to a driving target on the basis of an output signal from the binarization circuit 31. The method for determining will be described later.

Hereinafter, a non-feedback energization switching mode will be described.

The motor 160 is capable of performing a non-feedback energization switching driving by using the non-feedback energization switching driver 29.

Thus, the non-feedback energization switching driver 29 is capable of rotating the rotor 162 at a desired speed by sequentially switching the energization of the first coil 163 and the second coil 164 in accordance with an input driving pulse interval (a driving frequency) and a rotation direction.

Further, the non-feedback energization switching driver 29 is capable of rotating the rotor 162 by a desired angle in accordance with a number of driving pulses to be input. Moreover, in non-feedback energization switching driving, accurate speed control is possible on the basis of an input driving pulse interval, which makes stable driving possible even at a low speed.

Because the non-feedback energization switching driver 29 is capable of positioning so as to divide one step by micro-step driving, its resolution is high, which brings high controllability for microdisplacement.

However, when a driving pulse interval is made shorter (a driving frequency is made higher), the rotor 162 cannot respond to switching of the energization of coils 163, 164, which brings a high possibility to cause a step-out.

Therefore, it is necessary to set a lower limit on a driving pulse interval and to estimate a predetermined safety factor with respect to an actual load, which limits a driving at a high speed.

This non-feedback energization switching mode is a driving method by the second driving means for switching a state of energization of the coils 163, 164 of the motor 160 in accordance with a determined time interval.

Hereinafter, a feedback energization switching mode will be described.

The motor 160 is capable of rotating in the feedback energization switching mode to switch the energization on the basis of signals output from the first rotor position detecting sensor 171 and the second rotor position detecting sensor 172.

Figure 3:
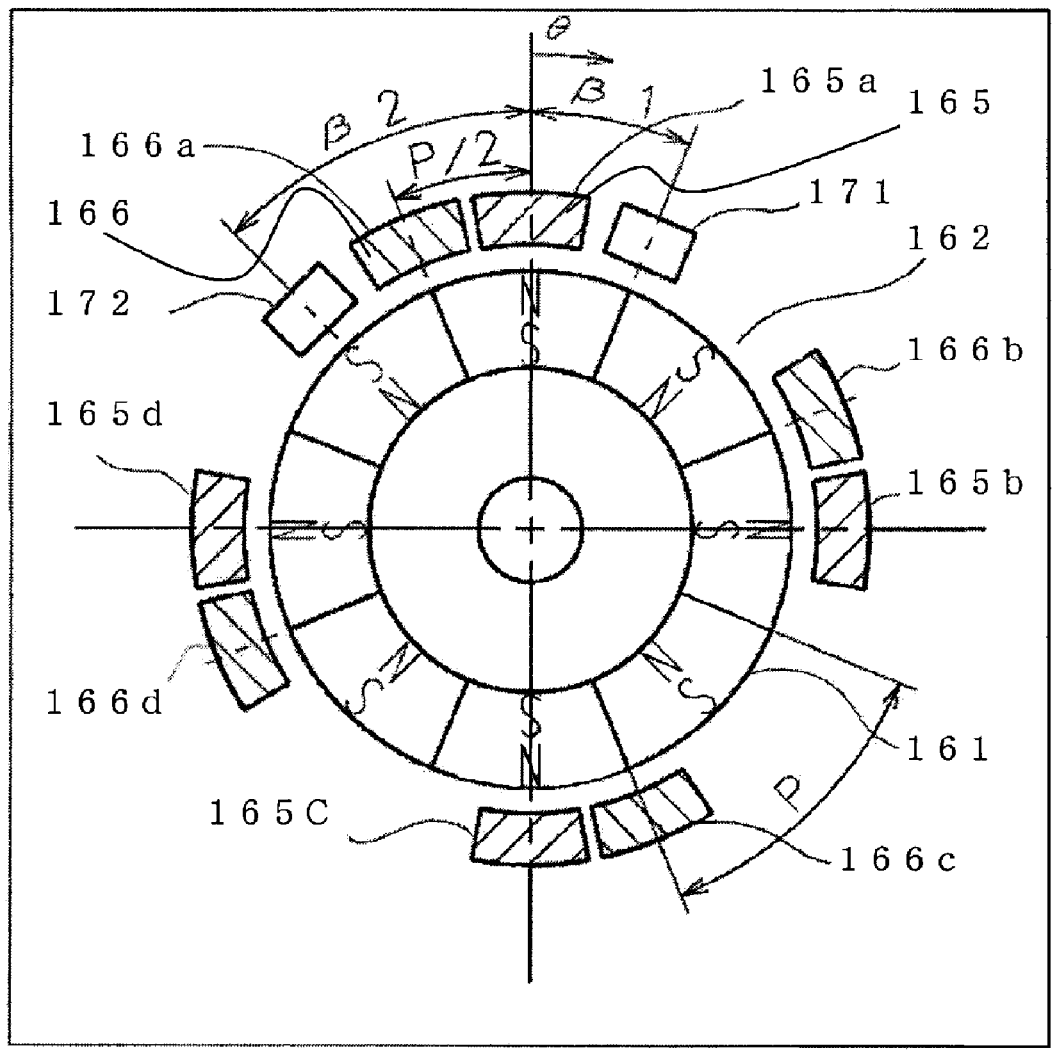
FIG. 3 is an axial sectional view showing a phase relationship between the yokes, the rotors, and the rotor position detecting sensors in the motor in FIG. 2.

FIG. 3 is an axial sectional view showing a phase relationship among the first yoke 165, the second yoke 166, the first rotor position detecting sensor 171, the second rotor position detecting sensor 172, and the rotor 162. FIG. 6 are axial sectional views showing the operations in the feedback energization switching mode. The clockwise rotation in the drawings is set as a forward direction.

In the present embodiment, a number of poles of the magnet is eight, and a magnetization angle P is 45°. With reference to the first yoke 165, a phase P/2 of the second yoke 166 is −22.5°, a phase β1 of the first rotor position detecting sensor 171 is +22.5°, and a phase β2 of the second rotor position detecting sensor 172 is −45°.

The configuration has been described above by using rotation angles of the rotor. However, the operations in the feedback energization switching mode will be hereinafter described by using electric angles.

In electric angle one cycle of magnetic force is expressed as 360°. Given that a number of poles of the magnet is M, and an actual angle is $\theta_0$, an electric angle $\theta$ can be expressed by the following formula.

$$\theta = (2 \times \theta_0 / M)$$

That is, given that a number of poles of the magnet 161 is M, an electric angle of 360° corresponds to 720/M° as a rotor rotation angle.

A phase difference between the first yoke 165 and the second yoke 166, a phase difference between the first rotor position detecting sensor 171 and the second rotor position detecting sensor 172, and a phase difference between the first yoke 165 and the first rotor position detecting sensor 171 are all 90° as the electric angle.

Note that, in FIG. 3, a center of the magnetic pole pieces 165a to 165d of the first yoke 165 and a center of a north pole of the magnet 161 face each other. This state is set as an initial state of the rotor, which is set to 0° as the electric angle.

Figure 7:
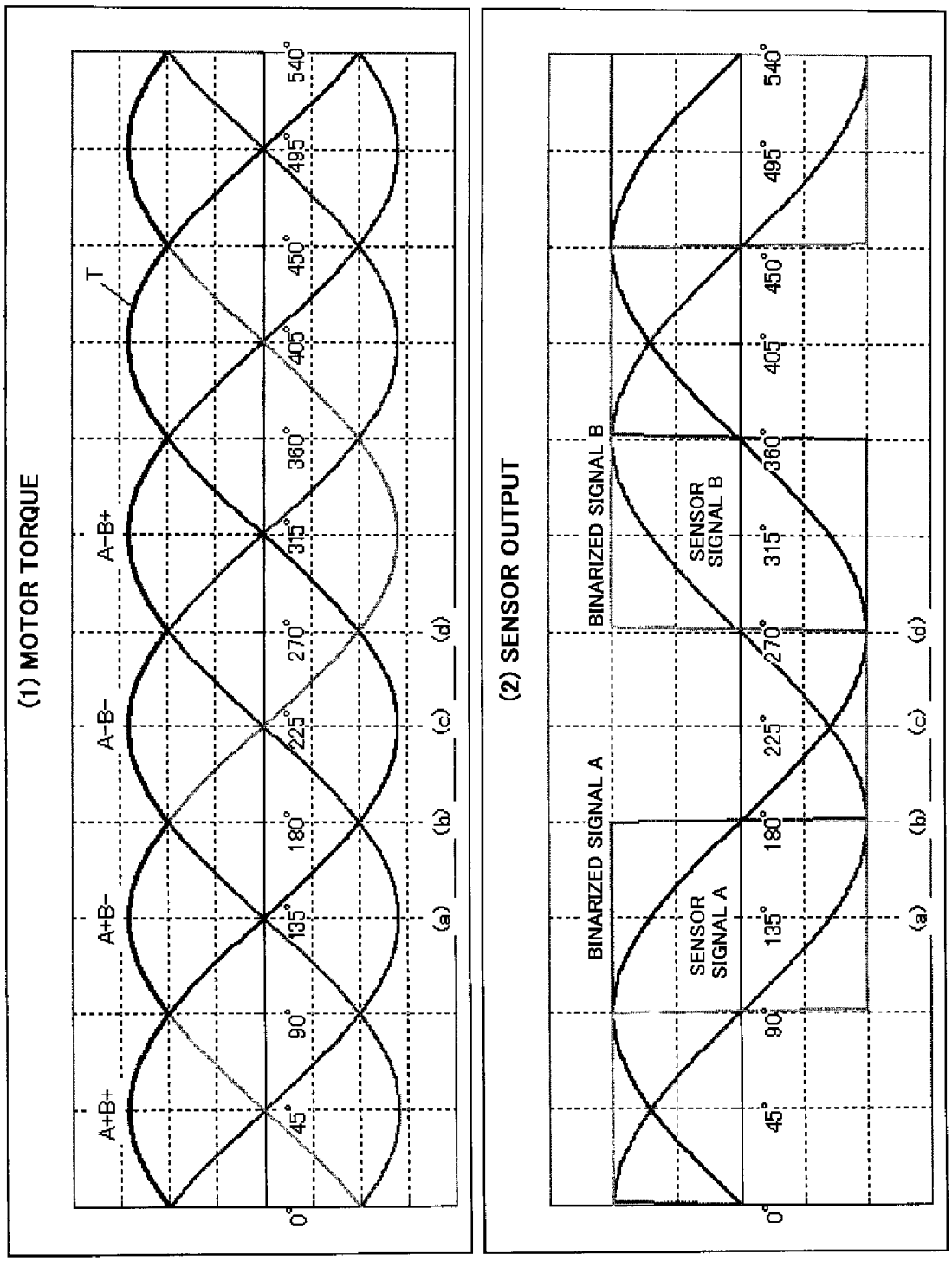
FIG. 7 are graphs showing sensor signal processing in a feedback energization switching mode of the motor in FIG. 2.

FIG. 7(2) is a graph showing a relationship between the rotor rotation angles and outputs from the two rotor position detecting sensors 171, 172. The horizontal axis shows electric angles and the vertical axis shows outputs from the rotor position detecting sensors 171, 172. The sensor signal A is an output from the first rotor position detecting sensor 171 and the sensor signal B is an output from the second rotor position detecting sensor 172.

The magnetic force of the magnet 161 in the first rotor position detecting sensor 171 becomes substantially a sinusoidal waveform with respect to the electrical angle. Therefore, the first rotor position detecting sensor 171 provides a substantially sinusoidal signal (the sensor signal A).

Note that, in the present embodiment, the first rotor position detecting sensor 171 outputs a positive value when facing the north pole of the magnet.

Further, because the second rotor position detecting sensor 172 is arranged so as to have a phase at an electric angle of 90° to the first rotor position detecting sensor 171, the second rotor position detecting sensor 172 provides a cosine signal (the sensor signal B).

Note that, in the present embodiment, because the polarity of the second rotor position detecting sensor 172 is set so as to reversed with respect to the first rotor position detecting sensor 171, the second rotor position detecting sensor 172 outputs a positive value when facing the south pole of the magnet 161.

Signals in which values of waveform signals as the sensor signal A and the sensor signal B are binarized to be + or − are a binarized signal A and a binarized signal B.

In the feedback energization switching mode, the energization of the first coil 163 is switched on the basis of the binarized signal A, and the energization of the second coil 164 is switched on the basis of the binarized signal B. That is, when the binarized signal A indicates a positive value, a forward current is made to flow in the first coil 163, and when the binarized signal A indicates a negative value, a backward current is made to flow in the first coil 163.

Further, when the binarized signal B indicates a positive value, a forward current is made to flow in the second coil 164, and when the binarized signal B indicates a negative value, a backward current is made to flow in the second coil 164.

FIG. 7(1) is a graph showing a relationship between the rotor rotation angles and motor torque. The horizontal axis shows electric angles and the vertical axis shows motor torque. The motor torque is defined such that torque for rotating the rotor clockwise is positive.

When a forward current is made to flow in the first coil 163, the first yoke 165 becomes magnetized to be the north pole, which generates an electromagnetic force between the first yoke 165 and the magnetic pole of the magnet 161. Further, when a forward current is made to flow in the second coil 164, the second yoke 166 becomes magnetized to be the north pole, which generates an electromagnetic force between the second yoke 166 and the magnetic pole of the magnet 161.

Synthesizing two magnitudes of electromagnetic force provides substantially sinusoidal torque in accordance with a rotor rotation (torque curve A+B+). In another state of energization, synthesizing thereof provides substantially sinusoidal torque in the same way (torque curves A+B−, A−B−, A−B+)

Further, the first yoke 165 is arranged so as to have a phase at 90° as an electric angle to the second yoke 166, which provides a phase difference at 90° as an electric angle between the four magnitudes of torque each other.

Figure 6A:
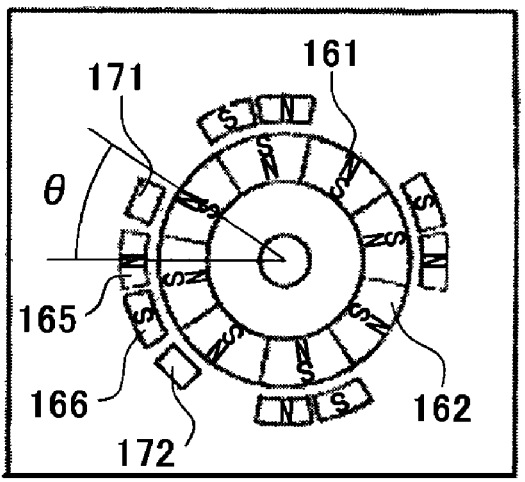
FIGS. 6A-6F are explanatory diagrams showing the operations in a feedback energization switching mode of the motor in FIG. 2.

FIG. 6A shows a state in which the rotor has rotated by 135° as an electric angle. The outputs from the respective sensors indicate the values shown by (a) in FIG. 7(2), in which the binarized signal A indicates a positive value and the binarized signal B indicates a negative value.

Accordingly, a forward current is made to flow in the first coil 163, and the first yoke 165 becomes magnetized to be the north pole. A backward current is made to flow in the second coil 164, and the second yoke 166 becomes magnetized to be the south pole.

At this time, clockwise torque corresponding to the torque curve A+B− in FIG. 7(1) is generated, and the rotor receives the torque toward the θ direction to rotate.

Figure 6D:
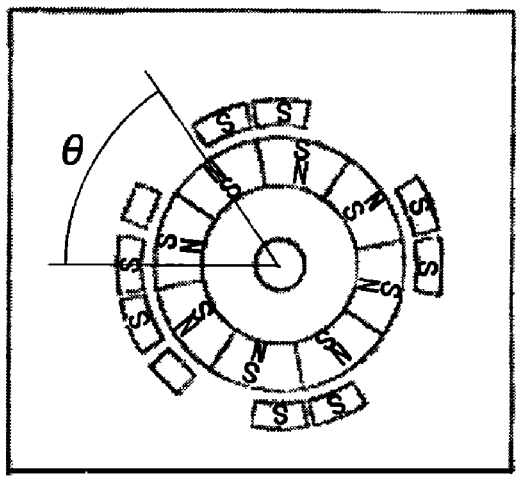
Figure 6B:
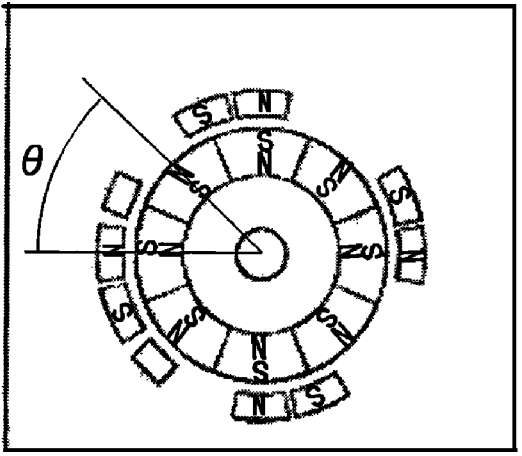

FIG. 6B shows a state in which the rotor has rotated by 180° as an electric angle. The first rotor position detecting sensor 171 is located at a boundary between the north pole and the south pole of the magnet 161.

Therefore, the binarized signal A switches its value from a positive value to a negative value with the boundary at 180° as an electric angle, which switches a direction of the energization of the first coil 163 from the forward direction to the backward direction. This electric angle corresponds to an electric angle of an intersection between the torque curve A+B− and the torque curve A−B−.

Figure 6E:
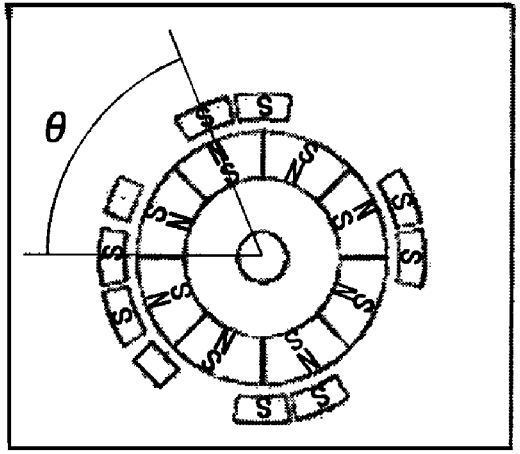
Figure 6C:
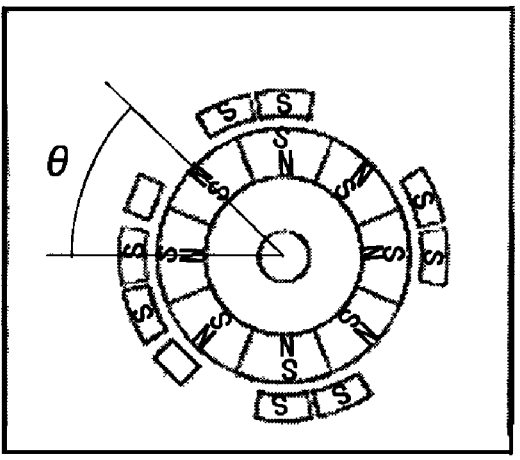

FIG. 6C shows a state in which the rotor has rotated by 180° as an electric angle, which has switched a direction of the energization of the first coil 163. A backward current is made to flow in the first coil 163, and the first yoke 165 becomes magnetized to be the south pole. A backward current is made to flow in the second coil 164, and the second yoke 166 becomes magnetized to be the south pole.

At this time, clockwise torque corresponding to the torque curve A−B− in FIG. 7(1) is generated, and the rotor receives the torque toward the θ direction to rotate.

FIG. 6D shows a state in which the rotor has rotated by 225° as an electric angle. The outputs from the respective sensors 171, 172 denote the values shown by (c) in FIG. 7(2), and the binarized signal A indicates a negative value and the binarized signal B indicates a negative value.

Accordingly, a backward current is made to flow in the first coil 163, and the first yoke 165 becomes magnetized to be a south pole. A backward current is made to flow in the second coil 164, and the second yoke 166 becomes magnetized to be a south pole.

At this time, clockwise torque corresponding to the torque curve A−B− in FIG. 7(1) is generated, and the rotor receives the torque toward the θ direction to rotate.

FIG. 6E shows a state in which the rotor has rotated by 270° as an electric angle. The second rotor position detecting sensor 172 is located at the boundary between the north pole and the south pole of the magnet 161.

Therefore, the binarized signal B switches its value from a negative value to a positive value with the boundary at 270° as the electric angle, which switches a direction of the energization of the second coil 164 from the backward direction to the forward direction. This electric angle corresponds to an electric angle of an intersection between the torque curve A−B− and the torque curve A−B+.

Figure 6F:
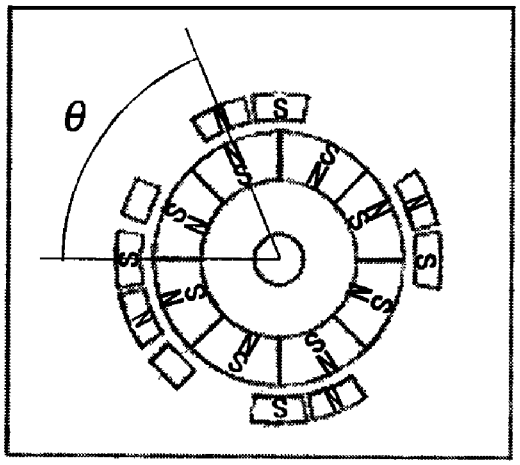

FIG. 6F shows a state in which the rotor has rotated by 270° as an electric angle, and a direction of the energization of the second coil 164 has been switched. A forward current is made to flow in the second coil 164, and the second yoke 166 becomes magnetized to be the south pole. A backward current is made to flow in the first coil 163, and the first yoke 165 becomes magnetized to be the south pole.

At this time, clockwise torque corresponding to the torque curve A−B+ in FIG. 7(1) is generated, and the rotor receives the torque toward the θ direction to rotate.

Repeating the above-described operations enables to a continuous rotation of the rotor. Inverting the positive and negative poles of the binarized signal A and the binarized signal B enables an inverse rotation as well.

In the feedback energization switching mode, inputting a number of driving pulses and a rotation direction enables a rotation of the rotor by a desired angle. Controlling an electric current made to flow in a coil can vary magnetic force between the magnetic pole pieces of each yoke and the magnetic poles of the magnet to control the torque applied to the rotor, so as to rotate the rotor at a desired speed.

Further, when the rotor is made to rotate at a high speed in the feedback energization switching mode, a cycle of switching energization is shortened, and the rising of an electric current value gets slower than the cycle of switching energization due to the effect of coil inductance. Thereby, the torque lowers.

However, by accelerating the phases of output signals from the position sensors, the slowing of the rising of an electric current is prevented and the lowering of torque at a high speed is moderated.

Note that, the present embodiment does not necessarily put limitations on the method for detecting a rotor position.

For example, a magnet for detection displaced according to a rotor rotation may be disposed to detect a rotor position, or a light-shielding plate or a pattern surface may be read by an optical sensor. Further, the rotor position detecting sensors may be integrally fixed to the motor 160, or may be fixed to another member separately from the motor 160.

This feedback energization switching mode is a driving method by the first driving means for switching a state of energization of the coils 163, 164 of the motor 160 in accordance with outputs from the rotor position detectors.

Hereinafter, the comparison between the feedback energization switching mode and the non-feedback energization switching mode will be described.

In the non-feedback energization switching mode, when a driving frequency is made higher, a rotor rotation cannot respond to switching of energization, which may cause a step-out.

On the other hand, in the feedback energization switching mode, energization is switched at an electric angle corresponding to an intersection between the respective torque curves as shown in FIG. 7(1) while detecting a rotor position, which allows to maximize torque provided from the motor 160 without causing a step-out.

Therefore, there is no need to set limits to a driving speed or calculate on a safety factor as in the non-feedback energization switching mode. That is, higher-speed and high-efficiency driving is possible in the feedback energization switching mode more than in the non-feedback energization switching mode.

However, in a feedback energization switching mode, a rotor rotation speed is controlled by controlling an electric current made to flow in a coil. However, the feedback energization switching mode comes under the influence of load torque fluctuations or the like, which makes it difficult to perform a high-accuracy speed control as compared with open energization switching driving.

Further, it is necessary to lower an electric current value in driving at a low speed, which lowers torque. Therefore, the positioning accuracy in driving at a low speed deteriorates, which makes it difficult to perform a high-accuracy shake correction for shake at a low speed.

In the non-feedback energization switching mode, energization is switched in accordance with a driving frequency provided from the outside of the motor 160, which allows to rotate the rotor at a constant speed. Further, controlling a driving frequency enables accurate speed control and positioning with less speed fluctuation.

In the present embodiment, an attempt is made to drive the light-amount adjusting apparatus at a high speed by operating the driving of the motor 160 so as to switch the feedback energization switching mode serving as a first driving mode and the non-feedback energization switching mode serving as a second driving mode.

Figure 5:
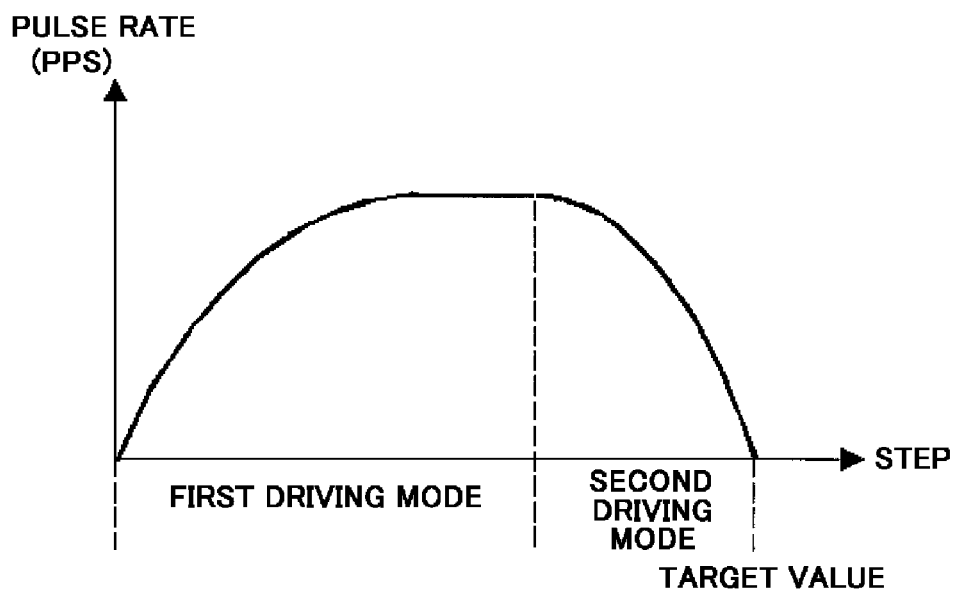
FIG. 5 is a graph showing a driving pattern of the motor in FIG. 2.

FIG. 5 is a graph showing a driving pattern of the motor 160, and the vertical axis shows pulse rates (PPS) in driving the motor 160, and the horizontal axis shows driving steps.

As in the graph, the motor 160 is driven partway from the starting in the feedback energization switching mode serving as the first driving mode.

When the motor 160 comes to be less than or equal to predetermined steps until a driving step target value, the feedback energization switching mode is switched to the non-feedback energization switching mode serving as a second driving mode, and the motor 160 is driven so as to decelerate and stop at a target position.

Thereby, high-speed and high-efficiency driving of the motor 160 is possible without causing a step-out until predetermined steps from the starting, and stable driving of the motor 160 is possible during deceleration, which allows to stop the rotor at an accurate position. That is, the light-amount control apparatus in the present embodiment is capable of performing high-speed and accurate positioning.

Hereinafter, a control of a stop position of the rotor in the present embodiment will be described.

First, cogging torque of the motor 160 serving as a driving source will be described with reference to FIG. 8.

Figures 8, 9:
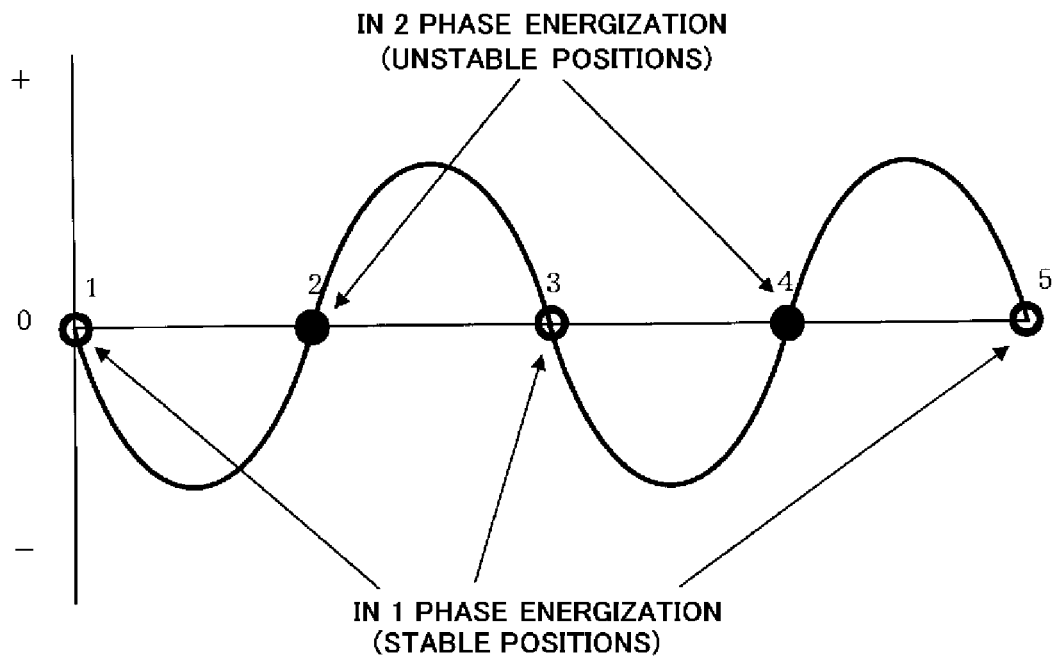
FIG. 8 is a chart showing cogging torque of the motor in FIG. 2.
FIG. 9 is a table showing a relationship among aperture values, motor driving steps, and output values from the rotor position detecting sensors of the light-amount adjusting apparatus in FIG. 1.

FIG. 8 is a chart showing cogging torque of the motor 160 in the present embodiment. This is the same as a general 2-phase stepper motor having two coils. The horizontal axis of the chart shows step positions of the motor 160 and the vertical axis of the chart shows torque values. A solid line denoted by a sine curve is a cogging torque curve.

Steps 1, 3, and 5 are positions of the motor 160 in 1 phase energization (energization of one coil) in 1-2 phase excitation in the non-feedback energization switching mode, and steps 2 and 4 are positions of the motor 160 in 2 phase energization (energization of the both coils) in 1-2 phase excitation in the non-feedback energization switching mode.

The positions of the steps 1, 3, and 5 are stable positions at which force to return the motor 160 to the position by cogging torque is applied even if the motor 160 slightly shifts from side to side from the position. The positions of the steps 2 and 4 are unstable positions at which force to cause the motor 160 to go forward by one step or go back by one step by cogging torque is applied even if only the motor 160 slightly shifts from side to side from the position.

That is, even when energization is turned off after 1 phase energization of the motor 160, force to cause the motor 160 to stay at the position by cogging torque is applied. However, when the energization is turned off after 2 phase energization, the motor 160 stops at the position in extremely rare cases, but stops at a position of one step forward or one step backward by cogging torque in many cases.

This is because a rotor stop position at the time of turning off energization varies according to a rotational accuracy of the motor 160.

Further, in a case of 2 phase excitation driving in the non-feedback energization switching mode as well, the motor 160 stops at the positions of the steps 2 and 4 during energization. Therefore, when the energization is turned off, the motor 160 stops at the position in extremely rare cases, but stops at a position of one step forward or one step backward by cogging torque.

FIG. 9 is a table showing a relationship among aperture values (Fno.), motor driving steps, and values output from the rotor position detecting sensors 171, 172 of the light-amount adjusting apparatus in the present embodiment.

As in the table, a number of driving steps of the motor 160 is determined in advance so as to correspond to each Fnos. At each driving step position, as shown in FIG. 7(2), corresponding values of binarized signals that outputs from the first rotor position detecting sensor 171 and the second rotor position detecting sensor 172 are binarized is automatically determined.

For example, in order to set an aperture Fno. of the light-amount control apparatus to 6.169, a number of driving steps of the motor 160 is set to 7, and corresponding value of binarized signals of the two rotor position detecting sensors 171, 172 at the position becomes H/L as shown in FIG. 7(a).

In order to set an aperture Fno. to 6.727, a number of driving steps of the motor 160 is set to 8, and corresponding values of binarized signals of the two rotor position detecting sensors 171, 172 at that position becomes L/L as shown in FIG. 7(c).

As described above, in the light-amount control apparatus in the present embodiment, because the motor 160 has the first rotor position detecting sensor 171 and the second rotor position detecting sensor 172, a motor driving step position is made capable of corresponding to a corresponding value of a binarized signal of the rotor position detecting sensors 171, 172. Accordingly, it is possible to determine whether or not the rotor stops at a target step position at the time of stopping the motor 160.

The optical apparatus 20 in the present embodiment has an energization-ON mode in which the motor 160 is stopped while maintaining the energization after driving it to a driving target, and an energization-OFF mode in which the energization of the motor 160 is turned off after driving it to a driving target. In order to suppress the consumption of the battery serving as an electric power supply, the optical apparatus 20 takes an energization-OFF mode when a shutter speed is longer than a predetermined time.

As described in FIG. 8, a rotor stop position may vary due to cogging torque at the time of turning off the energization.

Then, in the optical apparatus 20 in the present embodiment, output signals from the rotor position detecting sensors 171, 172 are binarized in an energization-OFF mode, and the binarized signal are compared with the corresponding values of the binarized signals in FIG. 9 at a target step position, to determine whether or not a rotor position at the time of turning off the energization is at a normal position.

In a case in which the rotor position shifts from the target step position, the energization of the motor 160 is turned on during the motor 160 is again exposed under the energization condition at the completion of driving when the motor 160 stops at the driving target step. At this time, a time to turn on energization is longer than the exposure time. Thereby, it is possible to reduce the consumption of the battery serving as an electric power supply and to retain the high accuracy of the light-amount adjusting apparatus.

Figure 10:
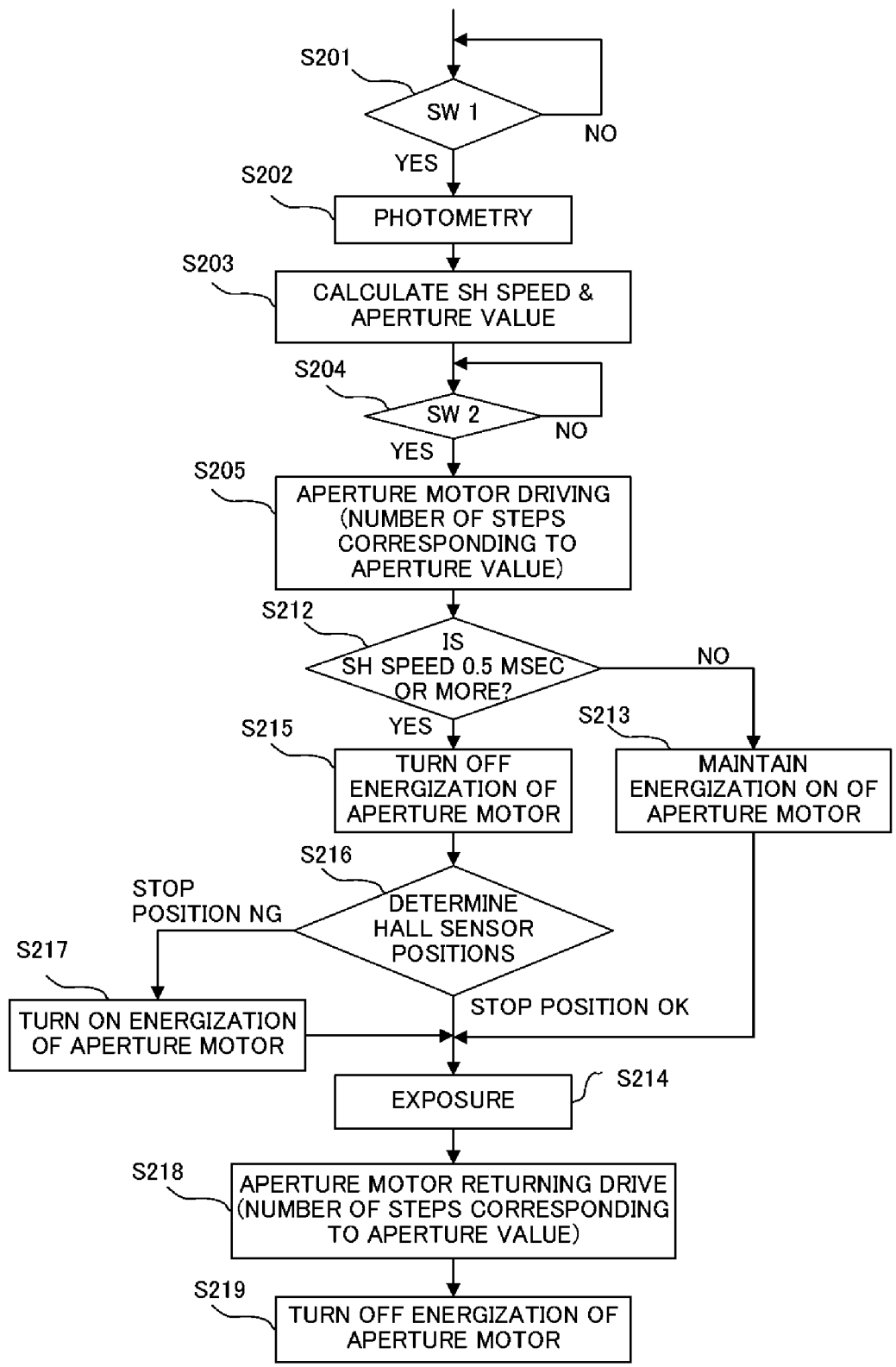
FIG. 10 is a flowchart showing operations of the optical apparatus having the light-amount adjusting apparatus in FIG. 1.
Figure 11:
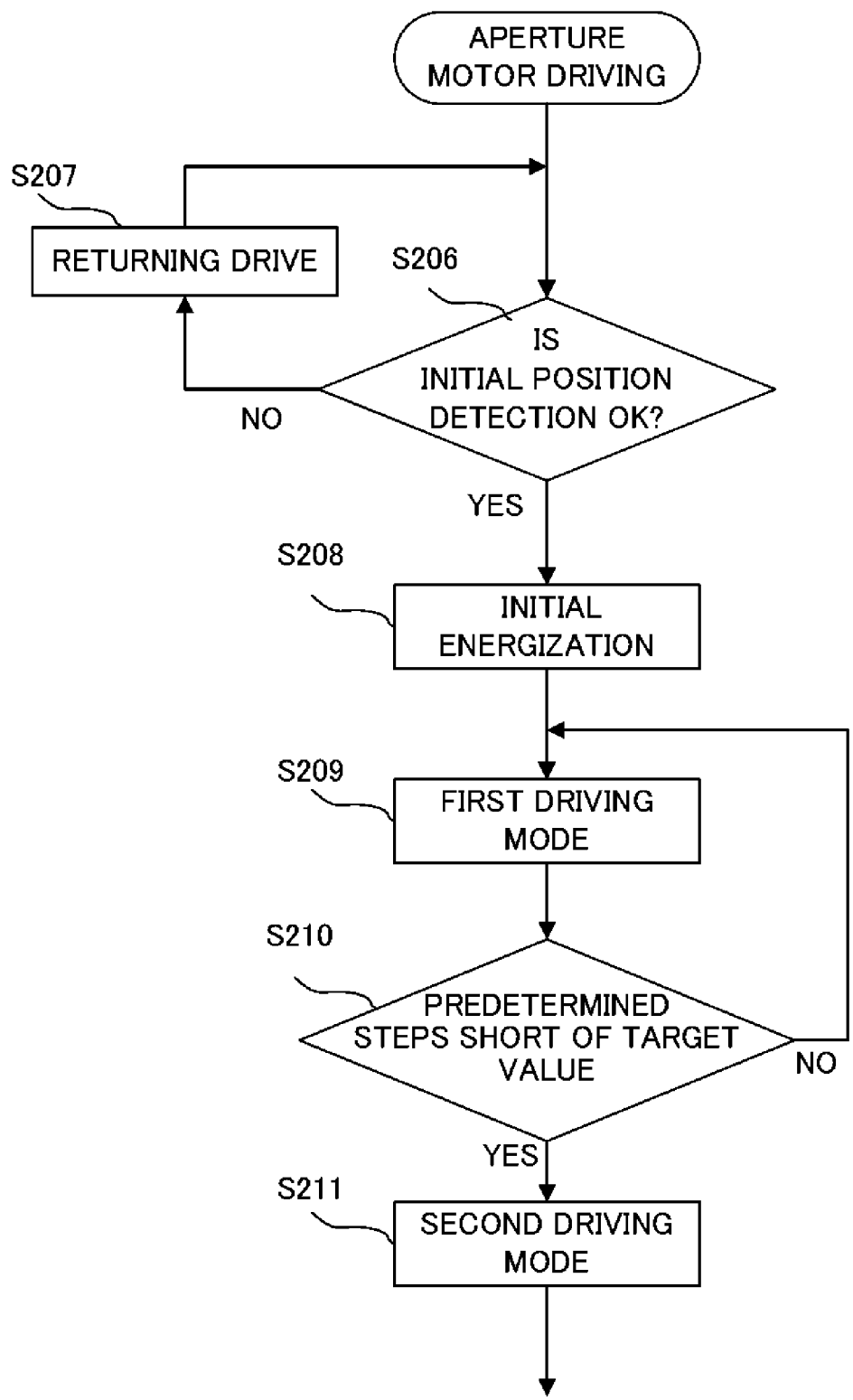
FIG. 11 is a flowchart showing the operations of aperture motor driving during the operations of the optical apparatus in FIG. 10.

Next, the operations of the optical apparatus having the light-amount adjusting apparatus in the present embodiment will be described with reference to flowcharts in FIGS. 10 and 11.

First, at step (hereinafter the inscription of step will be omitted) S201, an SW1 switch comes to be standby. When the SW1 switch is turned on by half-pressing a release button (not shown), the process proceeds to step S202, where the photometric apparatus 25 measures a light from an object.

Next, at S203, a shutter speed and an aperture value are calculated on the basis of the photometric value at S202.

At S204, a state of an SW2 switch is determined. When the SW2 switch is turned on by full-pressing the release button (not shown), the process proceeds to step S205, where the motor 160 serving as an aperture motor connected to the stop apparatus 22 is driven by a number of motor driving steps corresponding to the aperture value calculated at S203.

The situation of the aperture motor driving will be described in detail with reference to FIG. 11.

At S206, the initial position sensor 12 which detects a state of an initial position of the rotary member 8 detects whether or not the light-shielding blades 1 to 7 are at their initial positions (the aperture is open).

When it is detected that the light-shielding blades 1 to 7 are at their initial positions, the process proceeds to S208. When the initial position state is not detected, the process proceeds to S207, where return driving to rotate the motor 160 in a direction opposite to the aperture direction is carried out. At this time, the return driving is continued until the initial position state is detected.

At S208, an initial energization of the motor 160 is carried out under a predetermined energization condition. Thereafter, at S209, the motor 160 is started to drive in the feedback energization switching mode serving as the first driving mode by the feedback energization switching driver 28.

Rotating the motor 160 in the anticlockwise direction in FIG. 1 causes the pinion gear 11 to rotate, and because the pinion gear 11 engages with the gear part 8j of the rotary member 8, the rotary member 8 rotates in the clockwise direction in FIG. 1.

Because the first shanks 1c to 7c of the light-shielding blades 1 to 7 respectively fit into the holes 8b to 8h of the rotary member 8, in the light-shielding blades 1 to 7, moving the respective first shanks 1c to 7c causes the second shanks 1d to 7d to move along the cam grooves 9b to 9h of the cam member 9.

Herewith, these seven light-shielding blades 1 to 7 is inserted into the aperture position from the opening portion 9a of the cam member 9 by the same rotation motion of them.

At S210, it is determined whether or not a driving step of the motor 160 comes to predetermined steps short of a motor driving step position corresponding to the calculated aperture value at S203 serving as a target value.

The driving of the motor 160 in the feedback energization switching mode at S209 is continued until a driving step of the motor 160 comes to the predetermined steps short of it, and then the process proceeds to S211.

At S211, the driving mode of the motor 160 is switched by the switching circuit 30, and the motor 160 is driven by the non-feedback energization switching driver 29 so as to decelerate and stop at the target value in the non-feedback energization switching mode serving as a second driving mode.

When the aperture motor driving reaches the target value, at S212, the shutter speed calculated is determined at S203. When the shutter speed is less than 0.5 msec, the process proceeds to S213, where the energization of the motor 160 is maintained, and the process proceeds to S214 (an energization-ON mode).

When the shutter speed is greater than or equal to 0.5 msec, the process proceeds to S215, where the energization of the motor 160 is turned off (an energization-OFF mode).

After the energization of the motor 160 is turned off at S215, at S216, outputs from the first rotor position detecting sensor 171 and the second rotor position detecting sensor 172 constituted by the two hall sensors are detected.

The binarization circuit 31 binarizes these outputs, and the determination circuit 32 compares those with corresponding values of binarized signals due to be output from the hall sensors when the rotor stops at the aperture value calculated at S203, to determine whether or not the rotor stops at a target step position.

As a result of the determination, when the rotor stop position does not shift at all, the process proceeds to S214, and when the rotor stop position shifts to some extent, the process proceeds to S217, where the motor 160 is again energized under the energization condition at the time of stopping the motor 160 at the target step, and the process proceeds to S214.

At S214, the shutter apparatus 27 is driven at the shutter speed calculated at S203 by the shutter driving circuit 26 to expose the image pickup device 24, which performs image pickup recording.

At S218, the aperture motor by a number of steps corresponding to the aperture value is returned driving by driving the motor 160 in a direction opposite to the aperture direction. Thereafter, at 219, the energization of the motor 160 is turned off, which completes the process.

Note that, in the present embodiment, in order to save power consumption, a shutter speed is determined, and it is determined whether or not the shutter speed is less than 0.5 msec. However, the process is not limited thereto. Such a determination may be not carried out, and the energization may be always turned off after stopping the motor 160 at the target value at S211.

Embodiment 2

Figures 12, 13:
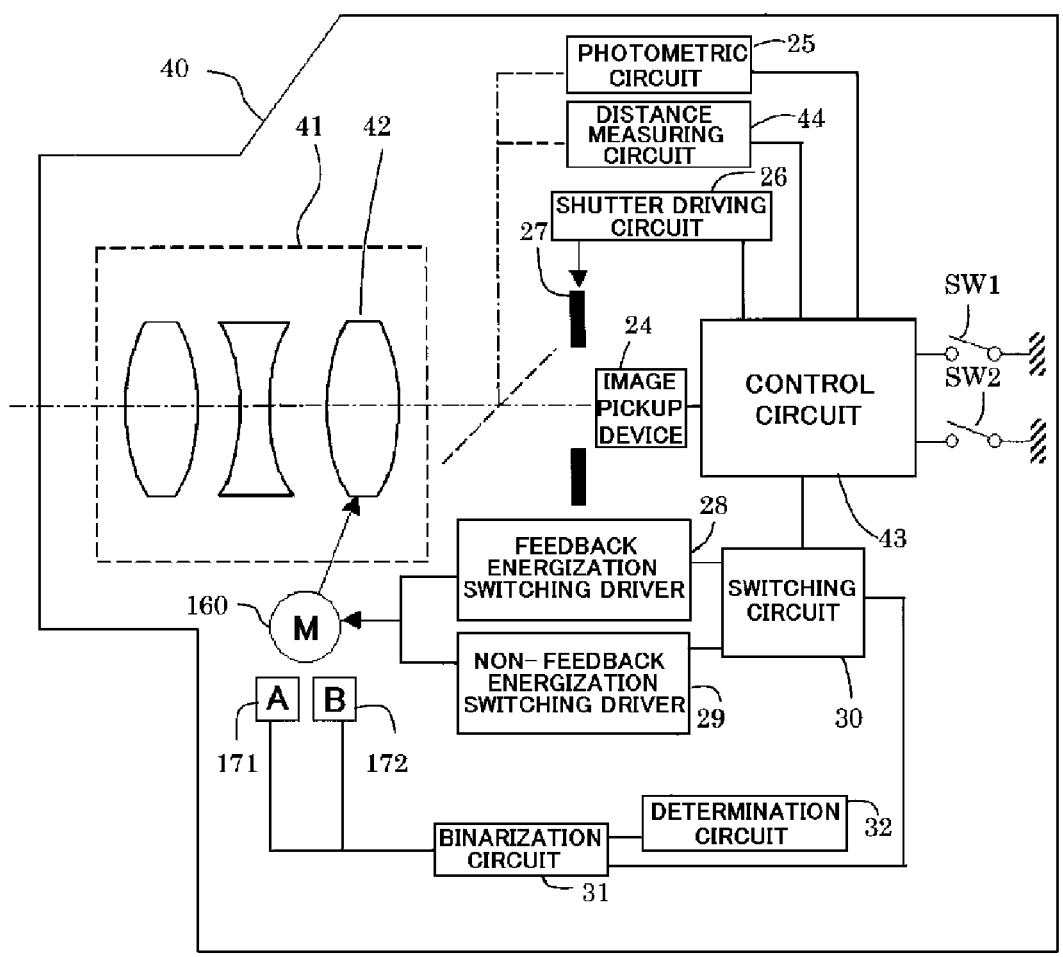
FIG. 12 is a block diagram showing a configuration of an optical apparatus having a light-amount adjusting apparatus according to a second embodiment (Embodiment 2).
FIG. 13 is a table showing a relationship between final energization states of the motor and output values from the rotor position detecting sensors.

FIGS. 12 and 13 are diagrams according to Embodiment 2 of the present invention. FIG. 12 is a block diagram showing the configuration of an optical apparatus in Embodiment 2 of the present invention, and FIG. 13 is a table showing a relationship between the energization states at the time of stopping the motor 160 and the output values from the rotor position detecting sensors 171, 172. Parts which are the same as reference numerals in Embodiment 1 are denoted by the same those, and descriptions thereof will be omitted.

In FIG. 13, reference numeral 40 denotes the optical apparatus 20 in Embodiment 2 of the present invention.

A light from an object passes through the shooting lens 41 to enter the image pickup device 24. A focus lens 42 is built in the shooting lens 41, and the motor 160 drives the focus lens 42 in an optical axis direction along with a lens holder (not shown).

A control circuit 43 includes a microcomputer which controls the entire optical apparatus 40.

A distance measuring circuit 44 outputs a defocusing amount calculated on the basis of a detection signal from the object output from an AF sensor (not shown) to the control circuit 43. The control circuit 43 determines a target driving distance of the focus lens 42 on the basis of the sensitivity of the focus lens 42. Further, the distance measuring circuit 44 determines a driving distance of the motor 160 required for driving the focus lens 42, to output a driving target signal (a number of AF motor driving steps).

The feedback energization switching driver 28, the non-feedback energization switching driver 29, the switching circuit 30, the binarization circuit 31, the determination circuit 32, the motor 160, the first rotor position detecting sensor 171, and the second rotor position detecting sensor 172 are constituted by the same members in Embodiment 1.

The focus lens 42, the unillustrated lens holder, the motor 160, the first rotor position detecting sensor 171, and the second rotor position detecting sensor 172 constitute a motor drive unit according to Embodiment 2.

In Embodiment 2, in the same way as Embodiment 1, an attempt is made to drive the focus lens at a high speed by operating the driving of the motor 160 so as to switch the feedback energization switching mode serving as the first driving mode and the non-feedback energization switching mode serving as the second driving mode.

The driving pattern of the motor 160 is as shown in FIG. 5, which is the same as that in Embodiment 1. Thereby, high-speed and high-efficiency driving of the motor 160 is possible without causing a step-out until predetermined steps from the starting.

Because an accurate speed control is possible during deceleration and a stable driving is possible even at a low speed, the rotor can be made to stop at an accurate position. Accordingly, the motor drive unit in Embodiment 2 is capable of performing high-speed and accurate positioning.

FIG. 13 is a table showing a relationship between final energization states of the motor 160 and output values from the rotor position detecting sensors 171, 172. Binarized signals of outputs from the first rotor position detecting sensor 171 and the second rotor position detecting sensor 172 and corresponding values of binarized signals are determined as shown in the table.

This provides an energization condition corresponding to a driving target stop position of the motor 160 serving as an AF motor.

For example, in a case in which the final energization state at the driving target stop position of the motor 160 is A+/B+, because the motor torque curve of A+/B+ in FIG. 7(1) comes to 0 at a position of an electric angle of 135°, the motor stops at the position of (a).

A corresponding value of binarized signals of outputs from the rotor position detecting sensors 171, 172 at the position of (a) is H/L as shown in FIG. 7(2).

In the same way, in a case in which the final energization state is A+/B−, because the motor torque curve of A+/B− in FIG. 7(1) comes to 0 at a position of an electric angle of 225°, the motor stops at the position of (c).

A corresponding value of binarized signals of outputs from the rotor position detecting sensors 171, 172 at the position of (c) is L/L as shown in FIG. 7(2).

As described above, in the motor drive unit in the present embodiment, because the motor 160 has the first rotor position detecting sensor 171 and the second rotor position detecting sensor 172, a motor driving step position corresponds to a corresponding value of binarized signals of the rotor position detecting sensors 171, 172. Accordingly, it is possible to determine whether or not the rotor stops at a target step position at the time of stopping the motor 160.

The optical apparatus in the present embodiment has, in the same way as in Embodiment 1, an energization-ON mode in which the motor 160 is stopped while maintaining energization after driving it to a driving target, and an energization-OFF mode in which energization of the motor 160 is turned off after driving it to a driving target. In order to suppress the consumption of the battery serving as an electric power supply, the optical apparatus 20 takes an energization-OFF mode when a shutter speed is longer than a predetermined time.

However, as described in FIG. 8 in Embodiment 1, a rotor stop position may vary due to cogging torque at the time of turning off the energization.

Then, in the optical apparatus 20 in the present embodiment, output signals from the rotor position detecting sensors 171, 172 are binarized in an energization-OFF mode, and the binarized signals are compared with corresponding values of binarized signals at a target step position, to determine whether or not a rotor position at the time of turning off the energization is at a normal position.

In a case in which the rotor position is not at the predetermined position, the energization of the motor 160 is turned on during the motor 160 is again exposed under the energization condition when the motor 160 stops at the driving target step. Thereby, it is possible to reduce the consumption of the battery serving as an electric power supply, and the high accuracy of the motor drive unit can be retained.

Figure 14:
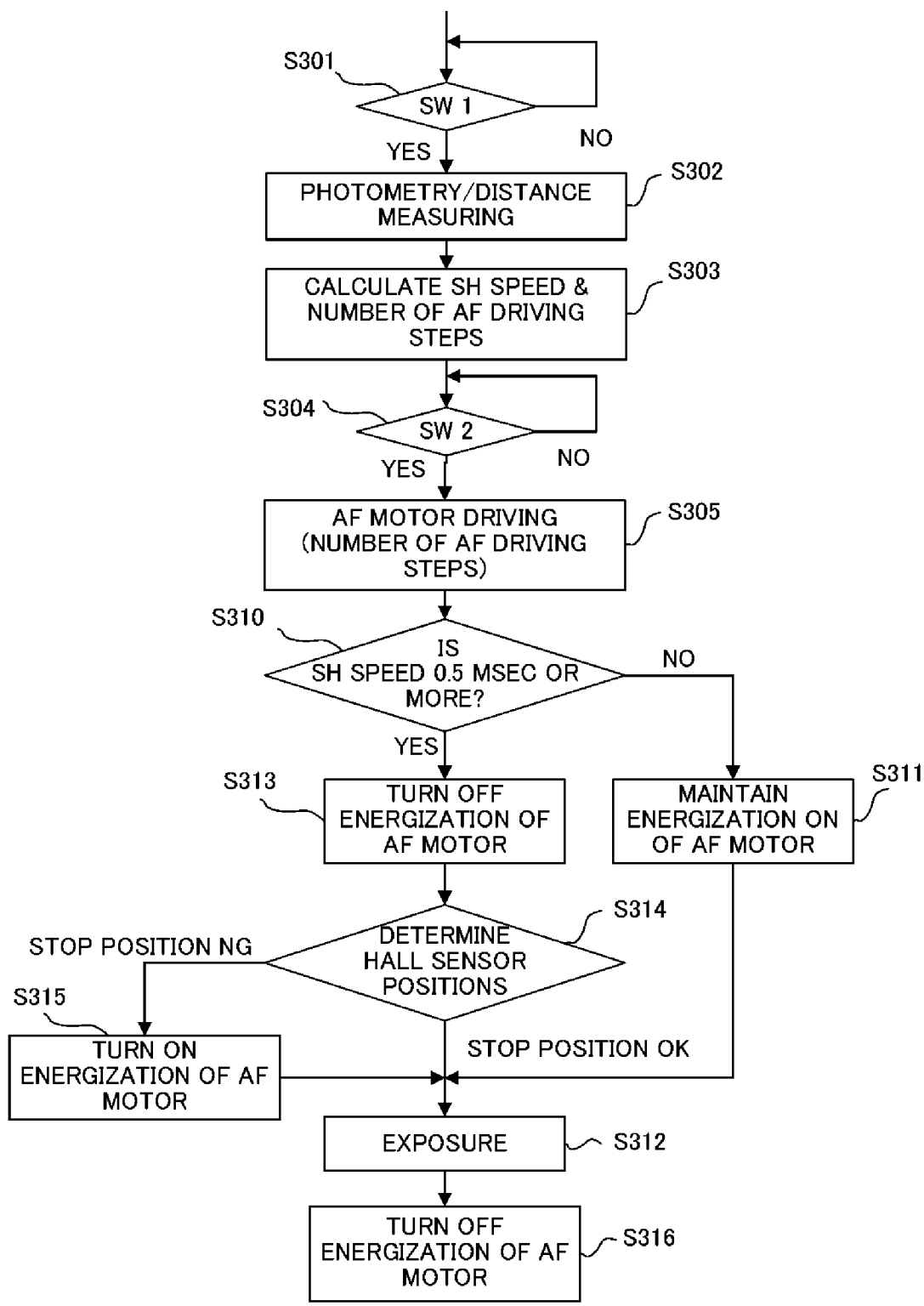
FIG. 14 is a flowchart showing operations of the optical apparatus in FIG. 12.
Figure 15:
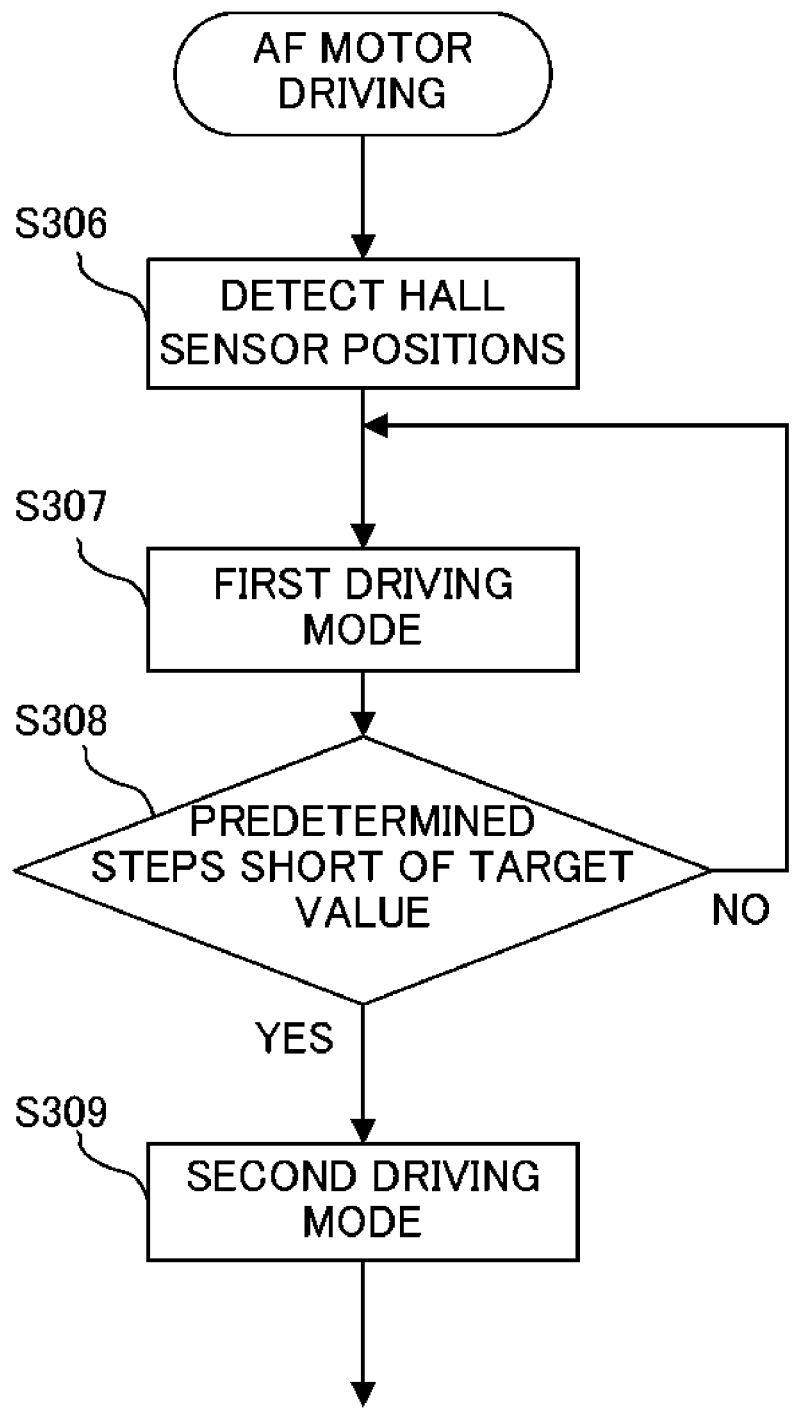
FIG. 15 is a flowchart showing operations of AF motor driving during the operations of the optical apparatus in FIG. 12.

Next, the operations of the optical apparatus 20 having the motor drive unit in the present embodiment will be described with reference to flowcharts in FIGS. 14 and 15.

First, at step (hereinafter this inscription of step will be omitted) S301, the SW1 switch comes to be standby. When the SW1 switch is turned on by half-pressing a release button (not shown), the process proceeds to step S302, where the photometric apparatus 25 measures a light from an object, and the distance measuring circuit 34 detects a defocusing amount of the focus lens 32.

Next, at S303, a shutter speed is calculated on the basis of the photometric value at S302. At the same time, a target driving distance of the focus lens 42 is determined on the basis of the defocusing amount at S302, to calculate a driving target signal (a number of AF motor driving steps) of the motor 160 required for driving the focus lens 42.

At S304, a state of the SW2 switch is determined. When the SW2 switch is turned on by full-pressing the release button (not shown), the process proceeds to step S305, where the motor 160 serving as an AF motor connected to the focus lens 42 is driven by a number of AF motor driving steps calculated at S303.

The situation of the AF motor driving will be described in detail with reference to FIG. 15.

First, at S306, the first rotor position detecting sensor 171 and the second rotor position detecting sensor 172 detect a current position state of the rotor. A state of the energization when the motor 160 stops at a target position is determined on the basis of this current position state and a number of AF moor driving steps.

For example, in a case in which a corresponding value of binarized signals of outputs from the hall elements at the current position is H/H, and a number of AF moor driving steps is 10, an energization condition for the AF motor comes to A+/B−.

At S307, the motor 160 is started to drive in the feedback energization switching mode serving as the first driving mode by the feedback energization switching driver 28.

At S308, it is determined whether or not a driving step of the motor 160 comes to predetermined steps short of a motor driving step position corresponding to the number of AF motor driving steps calculated at S303 serving as a target value.

The driving of the motor 160 in the feedback energization switching mode at S307 is continued until a driving step of the motor 160 comes to the predetermined steps short of it, the process proceeds to S309.

At S309, the driving mode of the motor 160 is switched by the switching circuit 30, and the motor 160 is driven so as to decelerate and stop at the target value in the non-feedback energization switching mode serving as a second driving mode by the non-feedback energization switching driver 29.

When the AF motor driving reaches the target value, at S310, the shutter speed calculated at S303 is determined. When the shutter speed is less than 0.5 msec, the process proceeds to S311, where the energization of the motor 160 is maintained, and the process proceeds to S312 (an energization-ON mode).

When the shutter speed is greater than or equal to 0.5 msec, the process proceeds to S313, where the energization of the motor 160 is turned off (an energization-OFF mode).

After the energization of the motor 160 is turned off at S313, at S314, outputs from the first rotor position detecting sensor 171 and the second rotor position detecting sensor 172 constituted by the two hall sensors are detected.

The binarization circuit 31 binarizes these outputs, and the determination circuit 32 compares those with corresponding values of binarized signals due to be output from the hall sensors when the AF motor stops, to determine whether the rotor stops at a target step position.

As a result of the determination, when the rotor stop position does not shift at all, the process proceeds to S312, and when the rotor stop position shifts to some extent, the process proceeds to S315, where the motor 160 is again energized under the final energization condition at the target step, and the process proceeds to S312.

At S312, the shutter apparatus 27 is driven at the shutter speed calculated at S303 by the shutter driving circuit 26 to expose the image pickup device 24. Thereafter, at S316, the energization of the motor 160 is turned off, which completes the process.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2008-015832, filed on Jan. 28, 2008, which is hereby incorporated by reference herein in its entirety.

What is claimed is:

1. A motor drive unit comprising:
a motor having a coil and a rotor;
a rotor position detector configured to output signals on the basis of a position of a rotor; and
a controller configured to drive the motor to a target position by using a first driving mode in which a state of energization of the coils of the motor is switched in accordance with outputs from the rotor position detector and a second driving mode in which a state of energization of the coils is switched on the basis of a predetermined time interval,
wherein, the controller turns on the energization of the coils during a predetermined time under an energization condition at a completion of driving to the target position when the rotor position detector detects that the rotor position shifts from the target position after turning off the energization of the coils according to the completion of driving to the target position.

2. A motor drive unit according to claim 1, wherein the rotor position detector has two sensors.

3. A motor drive unit according to claim 1,
wherein the controller binarizes outputs from the rotor position detector to be + or −, and compares the output values with a value output when the motor stops at the target position, to determine the shift from the target position.

4. An optical apparatus comprising:
a motor drive unit according to claim 1: and
a movable object configured to be driven by the motor drive unit.

5. An optical apparatus comprising:
a motor drive unit according to claim 1; and
a plurality of light-shielding blades configured to be driven by the motor drive unit.

6. An optical apparatus comprising:
a motor drive unit according to claim 1; and
a lens configured to be driven by the motor drive unit.

7. An optical apparatus comprising:
a motor drive unit according to claim 1; and
an image pickup device,
wherein the predetermined time is longer than or equal to an exposure time by the image pickup device.

* * * * *